United States Patent [19]

Gillois

[11] Patent Number: 4,621,385
[45] Date of Patent: Nov. 11, 1986

[54] AMPHIBIOUS VEHICLE THAT CAN BE USED AS AN INDEPENDENT FERRY AND ABLE TO FORM A PONTOON BRIDGE

[75] Inventor: Jean Gillois, Viroflay, France

[73] Assignee: Chaudronnerie et Forges d'Alsace - C.E.F.A., Soultz Sous Forêts, France

[21] Appl. No.: 646,927

[22] Filed: Sep. 4, 1984

[30] Foreign Application Priority Data

Sep. 19, 1983 [FR] France .................. 83 14859

[51] Int. Cl.⁴ .................. E01D 15/14; E01D 15/12
[52] U.S. Cl. .................. 14/2.4; 14/2.6; 14/27
[58] Field of Search .................. 14/2.4, 2.6, 27, 28, 14/30; 114/344, 345, 267, 270, 258, 263, 266; 441/40, 42, 43

[56] References Cited

U.S. PATENT DOCUMENTS

| | | | |
|---|---|---|---|
| 2,321,677 | 6/1943 | Higgins | 14/2.4 |
| 2,403,436 | 7/1946 | Heigis | 114/345 |
| 2,981,221 | 4/1961 | Gillois et al. | 114/270 |
| 3,269,349 | 8/1966 | Gehlen | 114/270 |
| 3,581,701 | 6/1971 | Gehlen | 114/270 |
| 4,145,786 | 3/1979 | Myers | 14/2.4 |
| 4,328,601 | 5/1982 | Rodler, Jr. et al. | |

FOREIGN PATENT DOCUMENTS

| | | |
|---|---|---|
| 2013032 | 3/1970 | France . |
| 1592501 | 6/1970 | France . |
| 1603771 | 7/1971 | France . |
| 2271117 | 12/1975 | France . |
| 2358314 | 2/1978 | France . |
| 2500504 | 8/1982 | France . |

Primary Examiner—James A. Leppink
Assistant Examiner—Matthew Smith
Attorney, Agent, or Firm—Browdy and Neimark

[57] ABSTRACT

An amphibious vehicle, which can be used as a water-crossing ferry or can be assembled with other such vehicles to form a pontoon bridge, includes a hull section hinged to two ramp sections. The hull section includes two lateral inflatable floats, having a length equal to that of the hull, connected to flaps hinged to the hull, the flaps having a length slightly less than that of the hull in order to leave visibility through side portholes located near the ends of the hull. In the inflated position, these lateral flaps form a horizontal extension of the upper surface of the hull, extending over the lateral floats. Each ramp section is equipped with two lateral floats of equal length with the ramps and of equal width with the lateral hull floats. The ramp floats are connected to ramp flaps, hinged to the ramp which extend the horizontal surface of the ramp when inflated and unfolded. Each ramp section is further equipped with a central float which extends between the two lateral floats.

12 Claims, 13 Drawing Figures

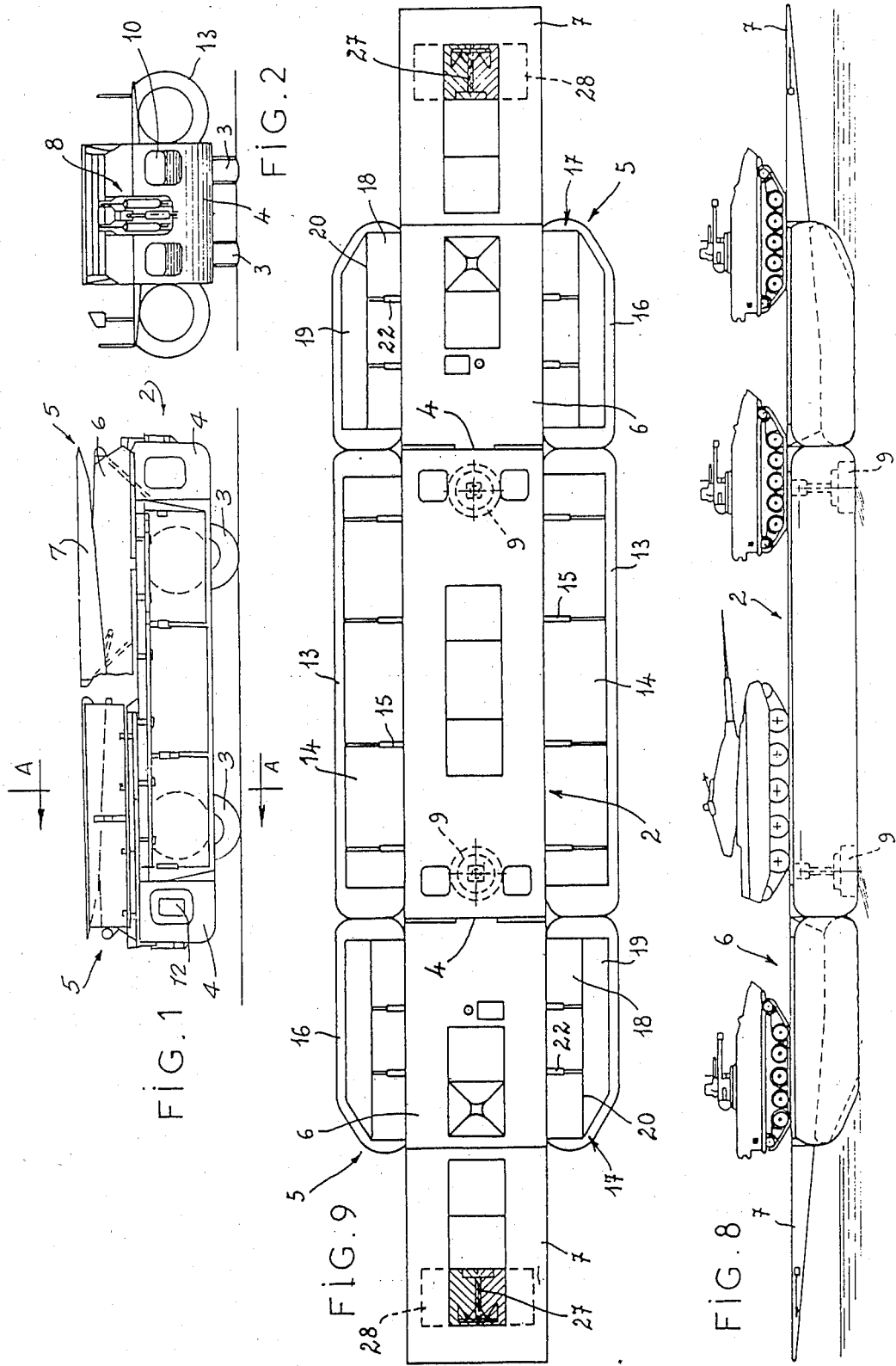

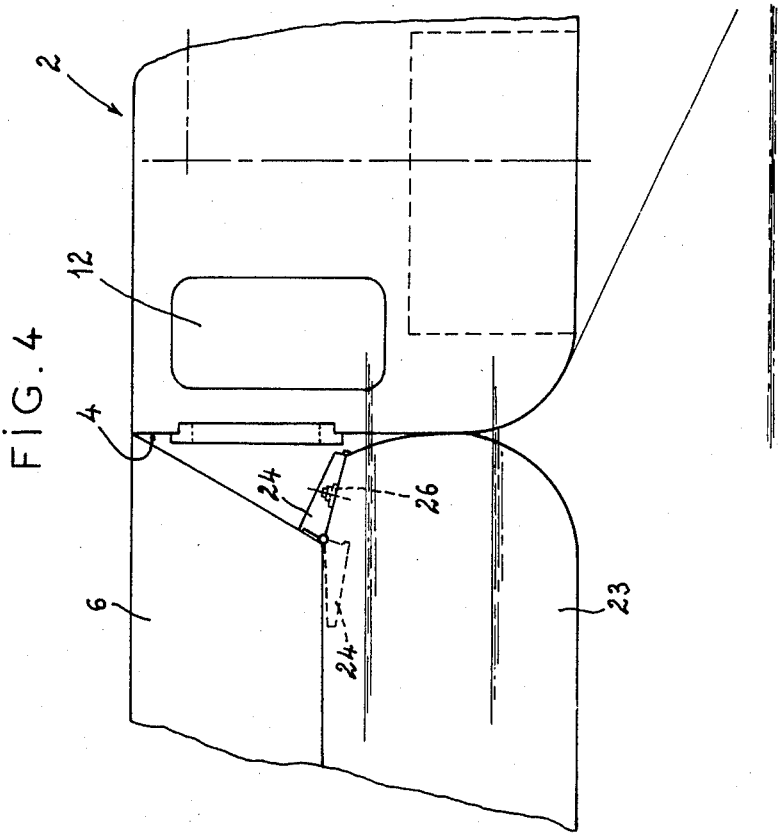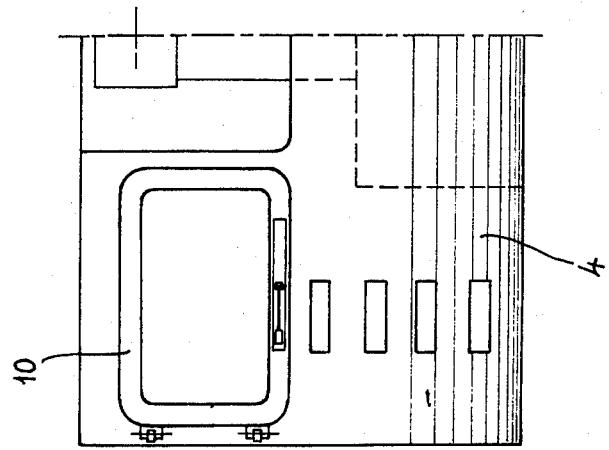

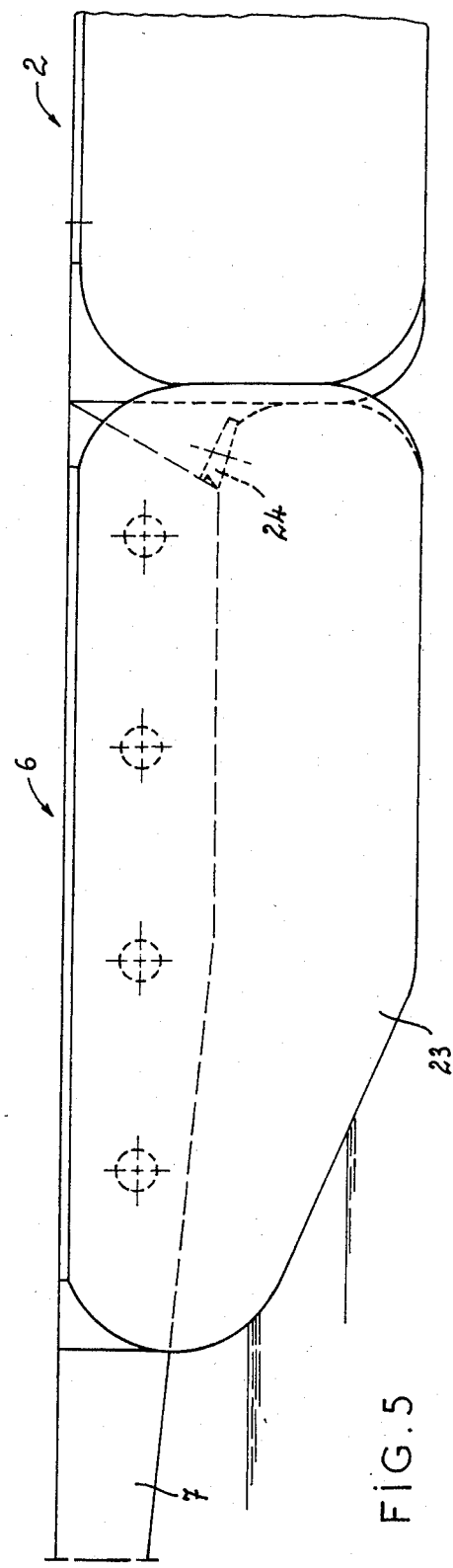
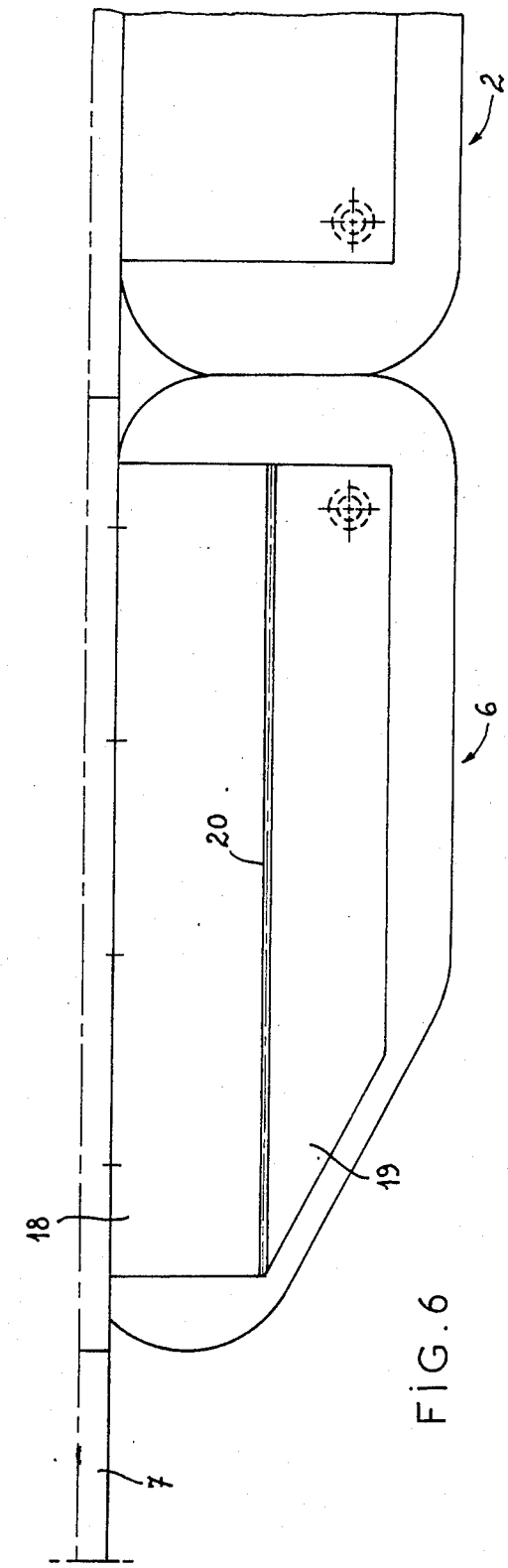

AMPHIBIOUS VEHICLE THAT CAN BE USED AS AN INDEPENDENT FERRY AND ABLE TO FORM A PONTOON BRIDGE

FIELD OF THE INVENTION

The present invention relates to an amphibious vehicle, and, more particularly, to a vehicle which can be used as an independent ferry for crossing stretches of water or which, assembled with other vehicles of the same type, can form a pontoon bridge. This vehicle is specifically, although not exclusively, intended to enable military vehicles or troops in case of armed conflicts to cross stretches of water or rivers.

BACKGROUND OF THE INVENTION

The last great conflict to be conducted on both sides of a large waterway brought out:

the slowness in construction and the long periods necessary for using standard pontoon bridges, even by personnel very well trained and highly motivated in a combat situation, and the very great fragility and vulnerability of these pontoon bridges which, detected, monitored and perfectly pinpointed by satellite, were systematically the target of long-range weapons at the most opportune time to cause maximum damage to equipment and to troops.

It follows from these findings that it is very advantageous to have, for crossing a waterway, a number of amphibious devices, of great operational efficiency, which are incomparably less vulnerable than pontoon bridges because of their mobility.

There is known a type of vehicle having a hull, equipped with retractable, motorized wheels for land movement, this hull forming a float for crossing stretches of water, and being equipped on its front walls with two series of hinged ramps which, when in unfolded position, extend the upper face of the hull and with it delimit the loading plane. The longitudinal side walls of the hull carry inflatable auxiliary floats for increasing the buoyancy of the vehicle when it is used as a ferry. In these vehicles, the inflatable auxiliary floats have a length less than that of the hull thereby leaving a space between each end of each auxiliary float and the adjacent one of the neighboring float carried by one of the vehicle ramps. This space is disadvantageous as the water can rush thereinto and thereby impair the stability of the vehicle.

Moreover, this type of vehicle generally includes aquatic propulsion means consisting of directable propellers mounted on telescopic supports placed vertically at its front walls. The good functioning of these propellers requires the presence of recesses and tunnels in the hull and spaces between the hull and the floats. This results in a considerable reduction of the volume of the hull, limiting its buoyancy, increasing the draft, and creating difficulties in access to the driver's stations, by requiring doors placed in the lateral walls. Furthermore, the propellers are very vulnerable, increase the draft of the vehicle, and impose shapes on the keel which allow only a mediocre passage in the water, considering the breaks in continuity between the various floating parts.

French Pat. No. 2,500,504 discloses a motorized bridge whose central element is equipped with two water jet propulsion devices which, in comparison with propeller devices, offer the advantage of considerably reduced bulk, less vulnerability, and finally, much less discomfort in the driver's station. The device still suffers from the other disadvantages of such vehicles discussed above.

SUMMARY OF THE INVENTION

The present invention aims at remedying all of these drawbacks. For this purpose, the vehicle to which it relates is of the above discussed type comprising a hull equipped with retractable wheels and inflatable longitudinal lateral floats, for crossing stretches of water and on whose front walls are hinged two series of ramps which, in folded position, rest on the upper wall of the hull, and in unfolded position, extend it. Among the improvements to such a vehicle are the facts that each lateral float associated with the hull has, in its inflated position, a length corresponding to the length of the hull, while each of the hinged flaps, which are connected with the floats, and occupy a horizontal position extending the upper wall of the hull in the inflated position of the floats, has a length slightly less than that of the hull. In this manner each float becomes an elastic wall system between the hull and the corresponding flap when deflated and, when the flaps are in their folded position, the end portholes placed in the lateral walls are freed to allow lateral visibility. Furthermore, each ramp section, which is hinged at one end of the hull and has a width corresponding to the width of the hull, is equipped with two inflatable longitudinal and lateral floats of a length corresponding to that of the ramp section, so as to rest on the corresponding lateral float of the hull.

The lateral ramp floats are retractable in the deflated position between a flap and the ramp section, each flap forming a horizontal extension of the upper wall of the ramp, in the inflated postion of the ramp.

Thereby lateral ramp floats come into contact with and have a cross-section identical with the lateral hull floats, which, on the one hand, improves the buoyancy of the vehicle and, on the other hand, assures a continuity of the waterlines of the vehicle.

Advantageously, each lateral float associated with a ramp has a width approximately equal to that of the lateral floats associated with the hull, and each flap associated with a lateral ramp float has a width approximately equal to that of the corresponding flap associated with a hull float, and is made in two parts hinged around a longitudinal axis.

This last characteristic is very advantageous because it makes it possible, despite the relatively slight height of the ramp elements, to fold alongside the ramp element flaps that have a total width equal to that of the flaps hinged on the hull.

Advantageously, each ramp section, hinged at one end of the hull, is also equipped with an inflatable float which occupies a central position, extending between the longitudinal floats, and comes to rest on the front wall of the hull. This central ramp float is held in position by a flap, placed on the ramp and hinged on the ramp around an axis parallel to the axis of articulation of the hull ramp. This crosswise flap performs the same functions as the flaps associated with the lateral floats, enabling the central compartment to be in contact with the hull without undergoing vertical deformations under hydrostatic thrust. Further, this hinged flap performs the function of a connecting brace between the two ramp elements folded by hydraulic or mechanical locking. In this way, the ramp performs its function of a homogeneous and indeformable grid when stresses are imposed under rolling loads, when the vehicle forms a bridge element.

Advantageously, the various floats are equipped with safety valves calibrated to a set value and are supplied pressurized air by constant-output compressor-decompressor units. This arrangement is advantageous because it makes possible a constant supplying of all the float compartments, assuring a compensation for constant leaks by the safety valves, or accidental leaks by tearing, for example. This constant injection of air assures a flexible and continuous joining of the various floats during the various movements of which the vehicle is capable, while the presence of safety valves prevents harmful excess pressures that can occur during maneuvering of the ramps, for example, when approaching a depression.

Furthermore, the compressor units are designed to function as decompressors by reversal of their direction of rotation, and are connected to the various compartments of the inflatable floats by double-acting valves associated with means controlling their opening when the unit operates in decompression. Such arangement assures a very rapid deflation of the various floats. These floats are recalled to their closing position by elastic straps. The flaps which are associated with the floats are, for their part, controlled by hydraulic jacks, except the outside of the ramp flaps which automatically fold during deflation of the associated floats.

Four compressor-decompressor units, one per lateral hull float and one in each ramp, are advantageously provided.

According to another advantageous characteristic of the present invention, each float is compartmented by conical partitions whose ends rest against one another. In case of a possible tear of a compartment, this arrangement makes possible the occupation of part of such a torn compartment by the ends of the neighboring compartments, which notably prevents reducing the buoyancy characteristics of the vehicle.

The adaptation of a control selector to the float inflation-deflation system makes it possible to assure inflation or deflation of all or part of the compartments as a function of the use or assembly of the vehicle, which can be in the following forms:

all the ramp compartments are elongated, in ferry configuration, or bridge edge part, and all the floats are inflated;

only the lateral hull floats are inflated, in assembly configuration, ramp folded;

in two-way assembly configuration, ferry or pontoon bridge portion configuration, only the outside floats are inflated.

Installation of a center float under the ramp section hinged on the hull, necessitates the movement of the anchoring system which, reinstalled at the end of each ramp, has its field of use extended to anchoring the vehicle in bridge configuration, by simple placing of removable flaps, fitted in the flooring, at right angles to the anchor. In this way, mooring of the anchor is always instantaneous, its normal lifting requiring only a few minutes which, in case of distress, can be reduced to nothing by paying of the cable.

According to another feature of the present invention, the means assuring the movement of the vehicle over the water consists of pressurized water jet propulsion units placed in the vicinity of the two front walls of the hull. Advantageously, each propulsion unit comprises a point for vertically aspirating water, bringing it to a horizontal helicoid, assuring compression of the fluid, and then projecting the propulsive jet tangentially to the helicoid at an angle on the order of 15° under the hull.

Equipping the vehicle with horizontal propulsion units instead of vertically telescoping propeller propulsion units, as are now used, makes it possible to modify profoundly the structure of the ends of the hull by eliminating all the tunnels for bringing the water to the propellers to include the propulsion units so that they are protected during landings or approaches in shallow water, while observing the angles of approach and leaving the vehicle compatible with all-terrain travel.

Thus, it is possible to increase the height of the front end panels of the hull and to provide in them access doors to the driver stations, facilitating the entry and exit of the team, even when the vehicle is afloat, the ramps being folded on the hull, thus making it possible to rescue the driver in case of distress of the vehicle in the navigation configuration. Elimination of the tunnels, which are necessary in case of propellers, makes it possible to lower the floor of the driver stations to the level of the stringers of the hull bottom, which improves the spaciousness and, consequently, the comfort of teams while allowing installation of better steering equipment.

Moving of the cabin doors from the lateral walls to the front walls, and their replacement, in the lateral walls, with simple stationary portholes of slight width, sufficient to assure side visibility during land maneuvers, contributes to allowing the length of the lateral floats to be extended to the ends of the hull.

BRIEF DESCRIPTION OF THE DRAWINGS

The present invention will be better understood with the aid of the following description with reference to the accompanying diagrammatic drawing representing, by way of non-limiting example, an embodiment of this vehicle FIG. 1 is a side view, in land travel configuration of a vehicle in accordance with the present invention;

FIG. 2 is a front view, in navigation configuration of the vehicle;

FIG. 3 is a partial view, on an enlarged scale, of a front wall of the vehicle;

FIG. 4 is a partial view, in longitudinal section, of an end of the hull and the ramp associated with it, during navigation;

FIG. 5 is a partial side view of an end of the hull and ramp section associated with it, during navigation;

FIG. 6 is a partial top view of a side of the hull and the ramp that is associated with it;

FIG. 8 is a side view of a vehicle during navigation, the ramps being deployed;

FIG. 9 is a top view, the ramps being deployed;

DETAILED DESCRIPTION OF PREFERRED EMBODIMENT

Figure 7B:
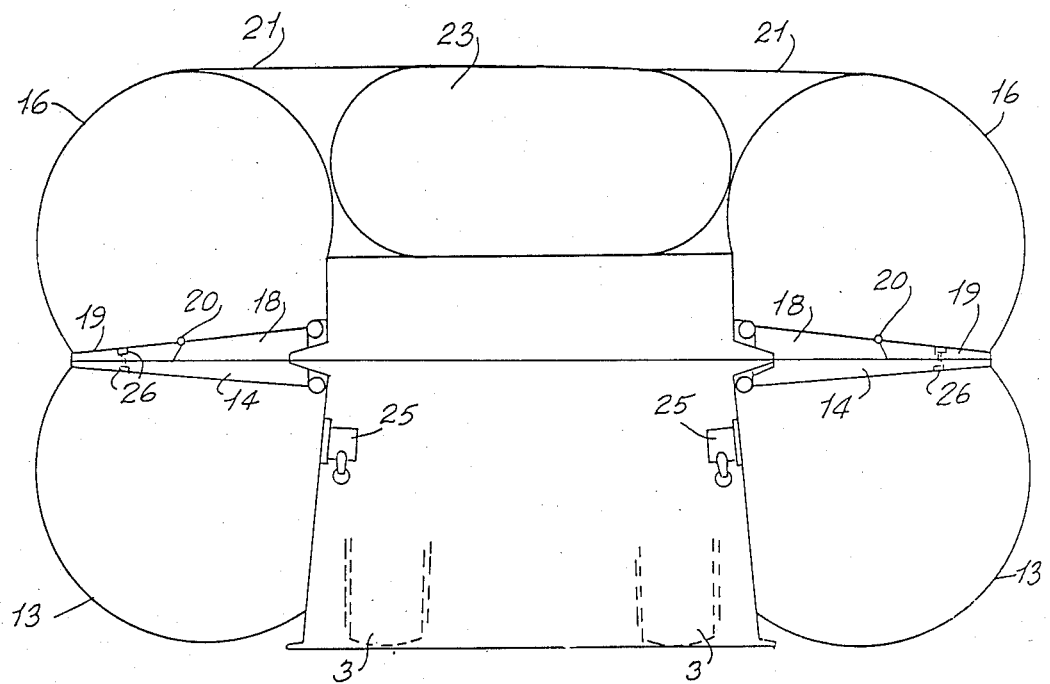
FIG. 7A and FIG. 7B show respectively vertical cross-sections along a part of the width of the hull in the folded position of the floats (FIG. 7A) and in the inflated position of the floats (FIG. 7B)

The vehicle shown in the drawing comprises a central part consisting of a hull 2 of generally parallelepipedal shape. This hull is equipped with motorized retractable wheels 3, allowing movement of the vehicle on land.

Figure 12:
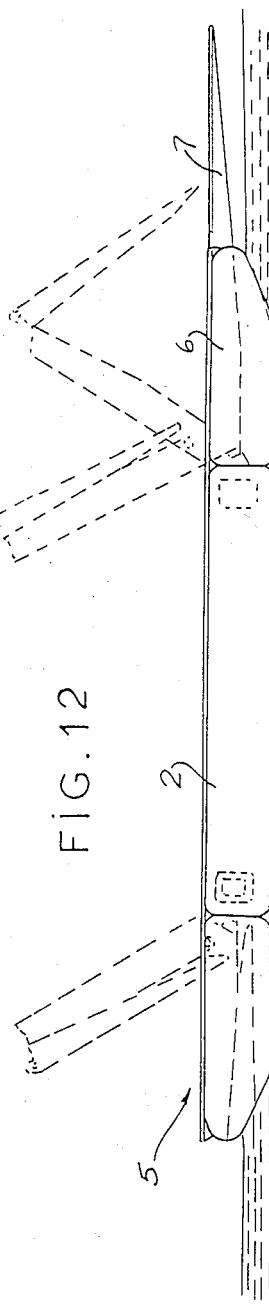
FIG. 12 is a side view showing unfolding of the ramps.

Both ends of the vehicle are the same and the vehicle may be driven from either end. Thus, both ends will hereinafter be referred to as "front". In the vicinity of the intersection of the two front panels 4 of the vehicle with the upper wall of the vehicle, are hinged two ramps 5, each of which comprises a first part 6, hinged directly on the hull 2, and a second part 7, hinged only on ramp section 6. Also see FIG. 12.

The operations of folding and unfolding the two ramps 5 can be performed by a group of jacks carrying the general reference 8 in the drawing.

In the vicinity of the two ends of the hull are placed two propulsion units 9 (see FIGS. 8 and 9), which comprise a zone for vertical aspiration of the water, bridging the latter to a helicoid assuring compression of the fluid, and then projecting the propulsive jet from the hull at an angle of about 15°.

Taking the propulsion system into account, the front panels of the hull are practically vertical over their entire height, making it posssible to provide doors 10 in them for access to the cabins. Side vision from the cabins forming the driver station is assured by stationary portholes 12 placed in the side walls, in the vicinity of their ends.

The hull 2 of the vehicle is equipped along its longitudinal walls with two inflatable floats 13. Each float 13 is associated with a flap 14 which has a length slightly less than that of the hull so as to free portholes 12 in the position of road travel. Each float 13 and flap 14 is placed vertically along a longitudinal wall of the hull and the flap 14 covers the corresponding float 13 as shown particularly (see FIG. 7B) and, in navigation position, the flap 14 occupies a horizontal position as an extension of the upper wall of the hull and prevents a vertical upward deformation of the corresponding inflated float 13 under the effect of hydrostatic pressure. Flaps 14 are operated with hydraulic jacks 15, while floats 13 fold into their closing positions under the action of elastic recall straps.

Figure 7A:
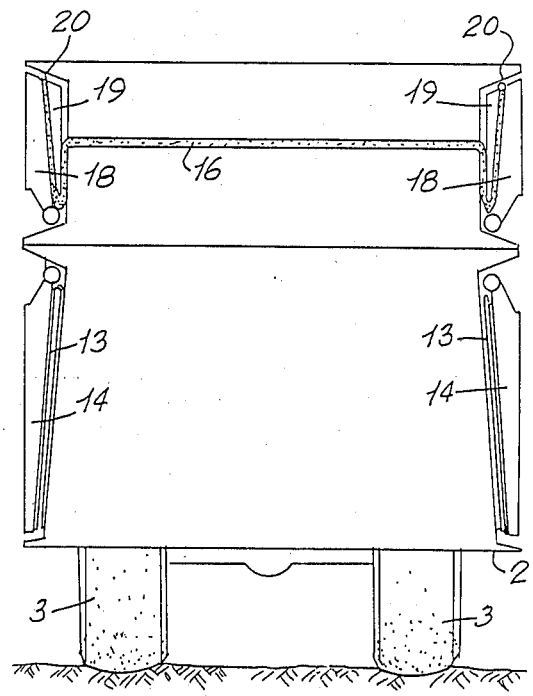

Each section 6 of a ramp 5 is equipped, for its part, with two lateral and longitudinal floats 16, each of which has a length corresponding approximately to that of said ramp section so as to rest when inflated on the corresponding lateral hull float 13 in FIG. 7A.

To allow the same dimensioning in section of floats 13 and 16, each of these latter is associated with a flap 17, made in two parts, 18 and 19 respectively, hinged around a longitudinal axis 20. Part 18 is operated by hydraulic jacks 22, while part 19 is automatically folded under the effect of the elastic recall of floats 16 in their deflated position.

This arrangement makes it possible to have lateral ramp floats, of large section, without flaps 17 for supporting them forming a bothersome enlargement of the vehicle when it travels on land.

Each section 6 of ramp 5 is also equipped with a central float 23 which, placed between the two lateral floats 16, comes to rest, in its inflated position, on front wall 4 of the hull. With this central float 23 is associated a flap 24, which, hinged on ramp 6, and able to fold along the latter in the deflated postion of the float, serves as horizontal support for the upper part of the float 13, in the zone located between the ramp section 6 and the front wall 4 of hull 2.

Central float 23 and the two lateral floats 16 are housed in the same casing 21, thus providing a single piece unit assuring good continuity of the waterlines.

As shown in FIG. 7, supplying of the various compartments of each float with air is performed from a compressor-decompressor unit, by a double-acting valve 25, each compartment having a discharge valve 26 calibrated to a value on the order of $0.2 \times 10^5$ Pa. Thus, it is possible to assure a constant pressure on the inside of the floats despite the various movements of the vehicle that can occur during navigation and despite possible leaks due to tears.

Figure 10:
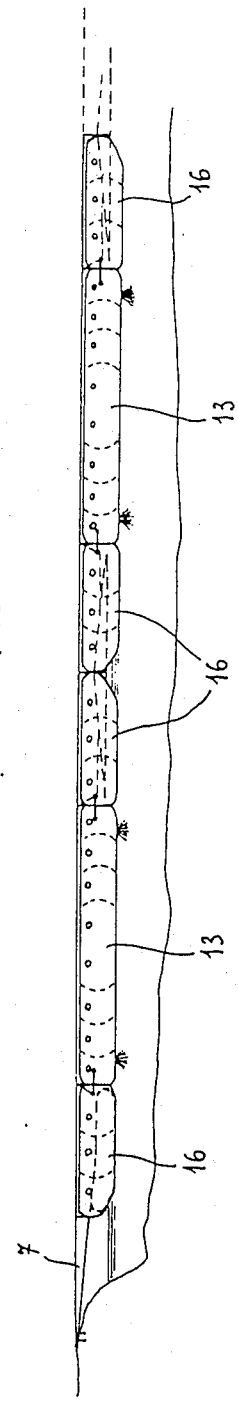
FIGS. 10 and 11 are two views, side and top respectively, of two vehicles according to the present invention, assembled with one another to form a pontoon bridge.
Figure 11:
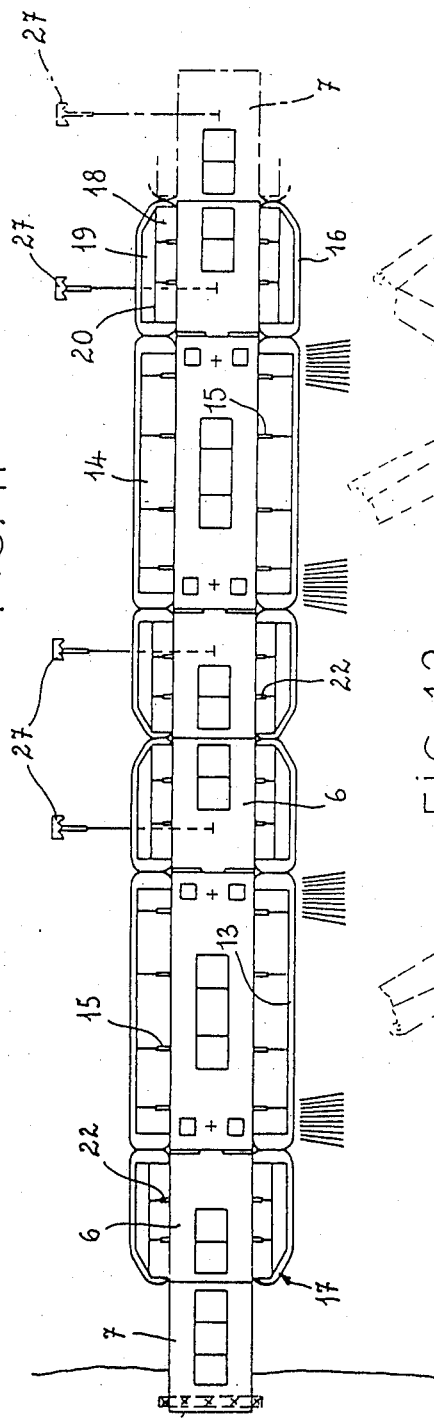

Because of the structure of the sections 6 of ramps 5, anchors 27 of the vehicle are housed in end ramp sections 7 and are closed by removable flaps 28. In the case where anchoring is necessary, for example during construction of a pontoon bridge placed crosswise to the direction of the current, as shown in FIGS. 10 and 11, anchors 27 are instantaneously released after dismounting of flaps 28. If necessary, holding of the bridge in place can be aided by operating propulsion units 9.

As can be understood from the above, the present invention is a great improvement in the existing art by providing an amphibious vehicle which, particularly because of its mode of aquatic propulsion, has numerous advantages in comparison with existing vehicles. The increase in the buoyancy of the hull itself, the increase of the volume of the inflatable floats, and the fact that the various inflatable floats can be perfectly contiguous, assure a reduction of the draft and an improvement of the hydrodynamic profile of the keel, increasing the performance of the vehicle.

It should also be noted that the movement capability in the water is improved because of the size of the surface of the floats which, made of a synthetic material, have a better sliding coefficient than the hull which, for its part, is made of metal.

It will be obvious to those skilled in the art that various changes may be made without departing from the scope of the invention and the invention is not to be considered limited to what is shown in the drawings and described in the specification.

What is claimed is:

1. In an amphibious vehicle of the type having a hull equipped with retractable wheels and inflatable lateral, longitudinal floats for crossing stretches of water, and having two series of ramps hinged to the front walls of said hull which, in the folded position rest on the upper wall of said hull and, in the unfolded position, extend the upper wall of said hull, the improvement wherein:

the length of each of said lateral hull floats corresponds to the length of said hull;

each of said lateral hull floats have, connected to the surface thereof which is uppermost when inflated, a lateral hull flap, said lateral hull flap being hinged to said hull in a manner such as to occupy a horizontal position extending the upper wall of the hull in the inflated position of said lateral hull floats, said lateral hull flaps having a length slightly less than that of said hull, whereby each said lateral hull float acts as an elastic recall system between said hull and the corresponding said lateral hull flap when deflated;

said hull includes portholes near the ends of the lateral walls thereof between the ends of said lateral walls and the ends of said lateral hull flaps when in the folded postition of said lateral hull flaps;

each said series of ramps includes a first ramp section hinged at one end thereof to said hull and having a width corresponding to the width of said hull;

each said first ramp section is equipped with two lateral, longitudinal ramp floats of a length corresponding to said first ramp section so as to come to rest on the corresponding lateral hull float in the inflated and unfolded position;

each said lateral ramp float has, connected to the surface thereof which is uppermost in the inflated and unfolded position, a ramp flap, each said ramp flap being hinged to said corresponding first ramp section in a manner such as to occupy a horizontal position extending the upper surface of said first ramp section in the inflated and unfolded position thereof; and each said lateral ramp float is retractable, in the deflated position, between the corresponding said ramp flap and said first ramp section.

2. An amphibious vehicle in accordance with claim 1, wherein each said lateral ramp float has a width approximately equal to that of said lateral hull floats, and each said lateral ramp flap has a width approximately equal to that of said lateral hull flaps, and wherein each said lateral ramp flap is made in two parts hinged around a longitudinal axis.

3. An amphibious vehicle in accordance with claim 1, wherein said first ramp section is further equipped with an inflatable central ramp float in a central position between such lateral ramp floats, said central ramp float coming to rest on the front wall of said hull in the inflated and unfolded position, each said first ramp section further including a central ramp flap which is hinged to the underside of said first ramp section, in the unfolded position thereof, around an axis parallel to the axis of articulation of said first ramp section on the hull.

4. An amphibious vehicle in accordance with claim 3, wherein said central ramp float is housed in the same casing as said lateral ramp floats to provide a single-piece float unit.

5. An amphibious vehicle in accordance with claim 1, further including constant output compressor-decompressor means for supplying pressurized air to said lateral hull and ramp floats, and wherein each said lateral hull and ramp floats are equipped with safety valves calibrated at a predetermined value.

6. An amphibious vehicle in accordance with claim 5, wherein said compressor-decompressor means are further for decompressing said floats, and are connected to said inflatable floats by double-acting valves associated with means controlling the opening thereof as soon as said compressor-decompressor means operates in decompression.

7. An amphibious vehicle in accordance with claim 1, further including constant output compressor-decompressor means for supplying pressurized air to said lateral hull floats and said central and lateral ramp floats, and wherein each said lateral hull floats and said central and lateral ramp floats are equipped with safety valves calibrated at a predetermined value.

8. An amphibious vehicle in accordance with claim 7, wherein said compressor-decompressor means are further for decompressing said floats, and are connected to said inflatable floats by double-acting valves associated with means controlling the opening thereof as soon as said compressor-decompressor means operates in decompression.

9. An amphibious vehicle in accordance with claim 1, wherein each said float is compartmented by conical partitions whose ends rest on one another.

10. An amphibious vehicle in accordance with claim 1, further including propulsion means assuring the movement of the vehicle on the water, consisting of pressurized water jet propulsion units placed in the vicinity of the end walls of said hull.

11. An amphibious vehicle in accordance with claim 10, wherein each said propulsion means includes means for vertically aspirating water bringing it to a horizontal helicoid, assuring compression of the fluid, and projecting the propulsive jet tangentially to the helicoid at an angle on the order of 15° under said hull.

12. A bridge formed of a plurality of amphibious vehicles according to claim 1, end-to-end, said plurality of amphibious vehicles including two end vehicles and at least one center vehicle, the two end vehicles each having a second ramp section hinged to said first ramp section and unfolded to rest on solid ground; and said at least one center vehicle having second ramp sections hinged to said first ramp sections and maintained in folded position.

* * * * *